United States Patent
Ebata et al.

(10) Patent No.: US 7,003,311 B2
(45) Date of Patent: Feb. 21, 2006

(54) METHOD OF SELECTING BASE STATION, AND MOBILE STATION, BASE STATION, AND RECORDING MEDIUM RECORDING PROGRAM

(75) Inventors: Koichi Ebata, Tokyo (JP); Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 595 days.

(21) Appl. No.: 10/139,505

(22) Filed: May 7, 2002

(65) Prior Publication Data
US 2002/0173310 A1 Nov. 21, 2002

(30) Foreign Application Priority Data
May 17, 2001 (JP) ............................ 2001-147693

(51) Int. Cl.
*H04B 7/00* (2006.01)
*H04Q 7/20* (2006.01)

(52) U.S. Cl. ...................... 455/525; 455/445; 455/561; 370/238.1; 370/328; 370/351

(58) Field of Classification Search ................ 455/445, 455/561, 524–525, 7, 11.1, 403; 370/254, 370/255, 237, 238, 238.1, 328, 338, 351, 370/400–401
See application file for complete search history.

(56) References Cited

U.S. PATENT DOCUMENTS

| | | | | |
|---|---|---|---|---|
| 5,907,540 A | * | 5/1999 | Hayashi | 370/315 |
| 6,035,196 A | * | 3/2000 | Hengeveld et al. | 455/437 |
| 6,064,890 A | * | 5/2000 | Hirose et al. | 455/513 |
| 6,697,627 B1 | * | 2/2004 | Ueno | 455/452.1 |
| 6,714,559 B1 | * | 3/2004 | Meier | 370/449 |
| 6,754,496 B1 | * | 6/2004 | Mohebbi et al. | 455/436 |
| 2002/0024935 A1 | * | 2/2002 | Furukawa et al. | 370/238 |

* cited by examiner

*Primary Examiner*—Temica Beamer
*Assistant Examiner*—Anthony S. Addy
(74) *Attorney, Agent, or Firm*—Dickstein, Shapiro, Morin & Oshinsky, LLP.

(57) ABSTRACT

The invention provides a method of selecting a base station according to which optimal quality can be achieved in the communication between a mobile station and a communication destination by efficiently using resources of the entire wireless network, as well as a mobile station and a base station. The base station selection method selects one from a plurality of base stations connected to the relay server, for a connection with the mobile station. In the method, each base station retains abase station routing cost which is a cost for the path connecting the base station to the communication network. And the mobile station measures a toward-base station routing cost for the path between itself and each base station, calculates a total routing cost for each base station by adding the base station routing cost and the toward-base station routing cost, and selects a base station associated with a minimal total routing cost when establishing a relay connection with the communication network.

19 Claims, 11 Drawing Sheets

METHOD OF SELECTING BASE STATION, AND MOBILE STATION, BASE STATION, AND RECORDING MEDIUM RECORDING PROGRAM

BACKGROUND OF THE INVENTION

1. Field of the Invention

The present invention relates to a method of selecting a base station, and a mobile station, a base station, and a recording medium recording program wherein the most appropriate base station is selected from a plurality of base stations, when a mobile station in a wireless network establishes a relay connection with a communication network.

2. Description of the Related Art

Generally, in a wireless network such as a cellular system, a wireless LAN system employing base stations, and the like, there are a plurality of base stations relay-connected to an external communication network and a mobile station connected to these base stations via radio channels. The most appropriate base station from the plurality of base stations is selected when the mobile station communicates with the communication network.

FIG. 11 is showing the overall architecture of a wireless network adopting a prior art method of selecting a base station. The wireless network 100 shown in FIG. 11 comprises a relay server 102 connected to an external communication network 101, four base stations 103 relay-connected to the relay server 102, and a mobile station 104 connected to these base stations 103 via radio channels.

In this network, the routing path is configured such that, the relay server 102 connects to a first base station 103A, the first base station 103A to a second base station 103B, the second base station 103B to a third base station 103C, and the third base station 103C to a fourth base station 103D.

For example, in communicating with the relay server 102, the mobile station 104 receives base station selection signals from the first base station 103A, the second base station 103B, the third base station 103C, and the fourth base station 103D to measure reception status of the received base station selection signals.

By measuring reception status such as received power of respective base station selection signals, the mobile station 104 selects a base station from base stations 103. The selected base station has an optimal reception status based on the measured results. The mobile station 104 connects to the relay server 102 for communication by establishing a wireless connection with the selected base station 103.

Thus, according to a prior art method of selecting a base station, the mobile station 104 can measure reception status such as received power of respective base station selection signals to select the base station 103 with an optimal reception status based on the measured results.

There is another prior art method of selecting a base station according to which respective base stations 103 receive signals about reception status sent from the mobile station 104, and send the received status to a control station or the like. The control station can select a base station 103 with an optimal reception status based on the received status.

To summarize, according to such prior art methods of selecting a base station, communication qualities between the mobile station 104 and base stations 103 may be collected so as to select a base station with the best communication quality, for example, one that has the highest received signal power as the most appropriate station for the wireless connection of the mobile station 104.

According to the above-described prior art methods of selecting a base station, a base station 103 that provides the highest communication quality with the mobile station 104 is selected as the most appropriate base station for the wireless connection of the mobile station 104. For example, when the mobile station 104 establishes a relay connection with the relay server 102, if communication with the fourth base station 103D provides the best quality, even though communication with the first base station 103A may also provide high quality, the fourth base station 103D will be selected as the most appropriate base station. Thus, the mobile station 104 will establish a wireless connection with the fourth base station 103D. However, this will lead to increased traffic between base stations 103 compared to the case where the mobile station 104 establishes a wireless connection with the first base station 103A, for example, since the traffic from the mobile station 104 destined for the relay server 102 travels through the fourth base station 103D, the third base station 103C, the second base station 103B, and the first base station 103A to reach the relay server 102. Consequently, the transmission delay between the mobile station 104 and the relay server 102 will also be increased.

According to the above described prior art methods of selecting a base station, while the case where paths between the base stations 103 are established via wired channels has been described, a multi-hop network in which paths between the base stations 103 are established via radio channels could be employed. In such cases, communication qualities will be significantly affected by not only communication qualities between the mobile station 104 and the base station 103D, but also communication qualities of the wireless links along the relay paths between the mobile station 104 and the relay server 102.

For example, the third base station 103C might be selected as the most appropriate base station, since communication between the mobile station 104 and the third base station 103C providing the best quality. Nevertheless, there are cases where many wireless links are involved along the paths from the third base station 103C to the relay server 102 so that communication between the mobile station 104 and the relay server 102 does not necessarily provide the best quality even though the third base station 103C is selected as the most appropriate station.

SUMMARY OF THE INVENTION

The present invention was devised in view of the above described problems, and its object is to provide a method of selecting a base station, and a mobile station, a base station, and a recording medium recording program wherein a mobile station can obtain optimal quality in its communication with the communication destination by efficiently using resources of the entire wireless network.

To accomplish the above described object, the invention provides a method of selecting a base station including a plurality of base stations relay-connected to the communication network, and a mobile station connected to those base stations via radio channels, wherein the most appropriate base station is selected from among the plurality of base stations when the mobile station establishes a relay connection with the communication network, the method comprising a sending step of sending a base station routing cost information retained by each base station to the mobile station, the base station routing cost representing a cost for a base station to establish a path between the base station and the communication network, a receiving step of receiving at the mobile station the base station routing cost information sent by each base station, and a toward-base station routing cost measuring step of measuring at the mobile station a toward-base station routing cost for the mobile station to establish a path with a base station station, and a total routing cost calculating step of calculating a total routing cost for each base station by adding the base station routing cost and the toward-base station routing cost for each base station at the mobile station, and a total routing cost information storing step of storing a total routing cost information for each base station at the mobile station, and a base station selecting step of selecting a base station associated with a minimal total routing cost based on the stored total routing cost information when the mobile station establishes a relay connection with the communication network.

Therefore, according to the base station selection method of the invention, each base station retains information of the base station routing cost for a path between itself and the communication network, the mobile station measures a toward-base station routing cost for a path between itself and each base station. Then the mobile station calculates a total routing cost for each base station by adding the base station routing cost and the toward-base station routing cost for each base station, and the mobile station stores the total routing cost for each base station, and selects abase station associated with a minimal total routing cost based on the stored total routing cost information when the mobile station establishes a relay connection with the communication network. Thus, by efficiently using resources of the entire wireless network, optimal quality may be achieved in the communication between the mobile station and the communication network.

Also, according to the base station selection method of the invention, the plurality of base stations are connected with each other via radio channels.

Thus, according to the base station selection method of the invention, even when a network of wireless multi-hop type is adopted to connect base stations with each other via radio channels, the mobile station can obtain optimal quality in its communication with the communication network.

Also, according to the base station selection method of the invention, the sending step sends the base station routing cost information to the mobile station using base station selection signal.

Thus, according to the base station selection method of the invention, since the base station routing cost information is sent to the mobile station with a normally used base station selection signal, there is no need to use another wireless resources for sending the base station routing cost information.

Also, according to the base station selection method of the invention, the base station routing cost, the toward-base station routing cost, and the total routing cost are routing information based on the number of relays or, propagation loss or, signal to noise ratio or, and signal to interference ratio.

Thus, according to the base station selection method of the invention, since the base station routing cost, toward-base station routing cost, and total routing cost are routing information based on the number of relays or, propagation loss or, signal to noise ratio or, and signal to interference ratio, a variety of decisions can be made for the purpose of selecting the most appropriate base station.

Also, the method of selecting a base station according to the invention comprises a predetermination measuring step of measuring a routing cost, that is different type from the toward-base station routing cost, for each base station, along the path between the mobile station and the base station, as a predetermined routing cost, and a predetermination storing step of storing the predetermined routing cost for each base station at the mobile station, the base station selecting step selecting a base station associated with a minimal predetermined routing cost, when there are some base stations with the same minimal total routing cost Thus, according to the base station selection method of the invention, the mobile station measures a routing cost, that is different type from the toward-base station routing cost, for each base station along the path between the mobile station and the base station as a predetermined routing cost. And when there are a plurality of base stations with the same minimal total routing cost, the mobile station selects a base station associated with a minimal predetermined routing cost. Thereby it can be possible to select the most appropriate base station with a greater accuracy.

Also, according to the base station selection method of the invention, the predetermined routing cost is routing information based on the number of relays, or propagation loss or, signal to noise ratio or, and signal to interference ratio.

Thus, according to the base station selection method of the invention, since the predetermined routing cost is routing information based on the number of relays or, propagation loss or, signal to noise ratio or, and signal to interference ratio, a variety of decisions can be made for the purpose of selecting the most appropriate base station.

Also, to achieve the above described object, the invention provides a mobile station connected to a plurality of base stations relay-connected to the communication network via radio channels for selecting the most appropriate base station from the plurality of base stations when establishing a relay connection with the communication network. And the mobile station has base station routing cost information receiving means for receiving information of base station routing cost for a path between the base station capable communicating with the mobile station and the communication network, toward-base station routing cost measuring means for measuring a toward-base station routing cost along a path between the mobile station and the base station that can communicate with the mobile station, total routing cost calculating means for calculating a total routing cost for each of the base stations that can communicate with the mobile station by adding the base station routing cost and the toward-base station routing cost, total routing cost information storing means for storing the total routing cost for each of the base stations that can communicate with the mobile station, and base station selecting means for selecting a base station associated with the minimal total routing cost based on the stored total routing cost information when the mobile station establishes a relay connection with the communication network.

Thus, the mobile station according to the invention receives information of the base station routing cost for a path between the base station and the communication network, measures the toward-base station routing cost for a path between itself and a base station, calculates the total routing cost for each base station by adding the base station routing cost and the toward-base station routing cost, stores the total routing cost for each base station, and selects abase station associated with a minimal total routing cost based on the stored total routing cost information when establishing a relay connection with the communication network. Thus, by efficiently using resources of the entire wireless network, the mobile station can obtain optimal quality in its communication with the communication network.

Also, according to the mobile station of the invention, connections between the plurality of base stations are established via radio channels.

Thus, according to the mobile station of the invention, even when a network of wireless multi-hop type where base stations are connected with each other via radio channels is adopted, the mobile station can obtain optimal quality in its communication with the communication network.

Also, according to the mobile station of the invention, the base station routing cost, the toward-base station routing cost, and the total routing cost are routing information based on the number of relays or, propagation loss or, signal to noise ratio or, and signal to interference ratio.

Thus, according to the mobile station of the invention, since the base station routing cost, toward-base station routing cost, and total routing cost are routing information based on the number of elays or, propagation loss or, signal to noise ratio or, and signal to interference ratio, a variety of decisions can be made for the purpose of selecting the most appropriate base station.

Also, the mobile station according to the invention comprises predetermined routing cost measuring means for measuring a routing cost, that is different type from the toward-base station routing cost, for the path between the mobile station and the base station that can communicate with the mobile station, as a predetermined routing cost, and predetermined routing cost information storing means for storing the predetermined routing cost for each of the base station that can communicate with the mobile station. The base station selecting means selects a base station associated with a minimal predetermined routing cost based on the predetermined routing cost information when there are some base stations with the minimal total routing cost.

Thus, the mobile station according to the invention measures a routing cost, that is different type from the toward-base station routing cost, for the path between the mobile station and the base station, as a predetermined routing cost. And when there are a plurality of base stations with a minimal total routing cost, the mobile station selects a base station associated with a minimal predetermined routing cost based on the predetermined routing cost information. Tthereby it can be possible to select the most appropriate base station with a greater accuracy.

Also, according to the mobile station of the invention, the predetermined routing cost is routing information based on the number of relays or, propagation loss or, signal to noise ratio or, and signal to interference ratio.

Thus, according to the mobile station of the invention, since the predetermined routing cost is routing information based on the number of relays or, propagation loss or, signal to noise ratio or, and signal to interference ratio, a variety of decisions can be made for the purpose of selecting the most appropriate base station.

Also, the base station according to the invention establishes a relay connection with the communication network, is connected with the mobile station via radio channels and sends a base station selection signal to the mobile station. The base station comprises base station routing cost information storing means for storing base station routing cost for a path to the communication network, and base station routing cost information sending means for sending the base station routing cost information to the mobile station with the base station selection signal.

Thus, according to the base station of the invention, since the base station routing cost information for a path between the base station and the communication network is stored in advance, and the stored base station routing cost information is sent to the mobile station using the base station selection signal, resources of the entire wireless network are used efficiently, thereby allowing the mobile station to obtain optimal quality in its communication with the communication network.

Also, according to the base station of the invention, connections between the base stations are established via radio channels.

Thus, according to the base station of the invention, even when a network of wireless multi-hop type is adopted to connect base stations with each other via radio channels, the mobile station can obtain optimal quality in its communication with the communication network.

Also, according to the base station of the invention, the base station routing cost is the number of relays or, propagation loss or, signal to noise ratio or, and signal to interference ratio.

Thus, according to the base station of the invention, since the base station routing cost is routing information based on the number of relays or, propagation loss or, signal to noise ratio or, and signal to interference ratio, a variety of decisions can be made for the purpose of selecting the most appropriate base station.

DESCRIPTION OF THE PREFERRED EMBODIMENT

Figure 1:
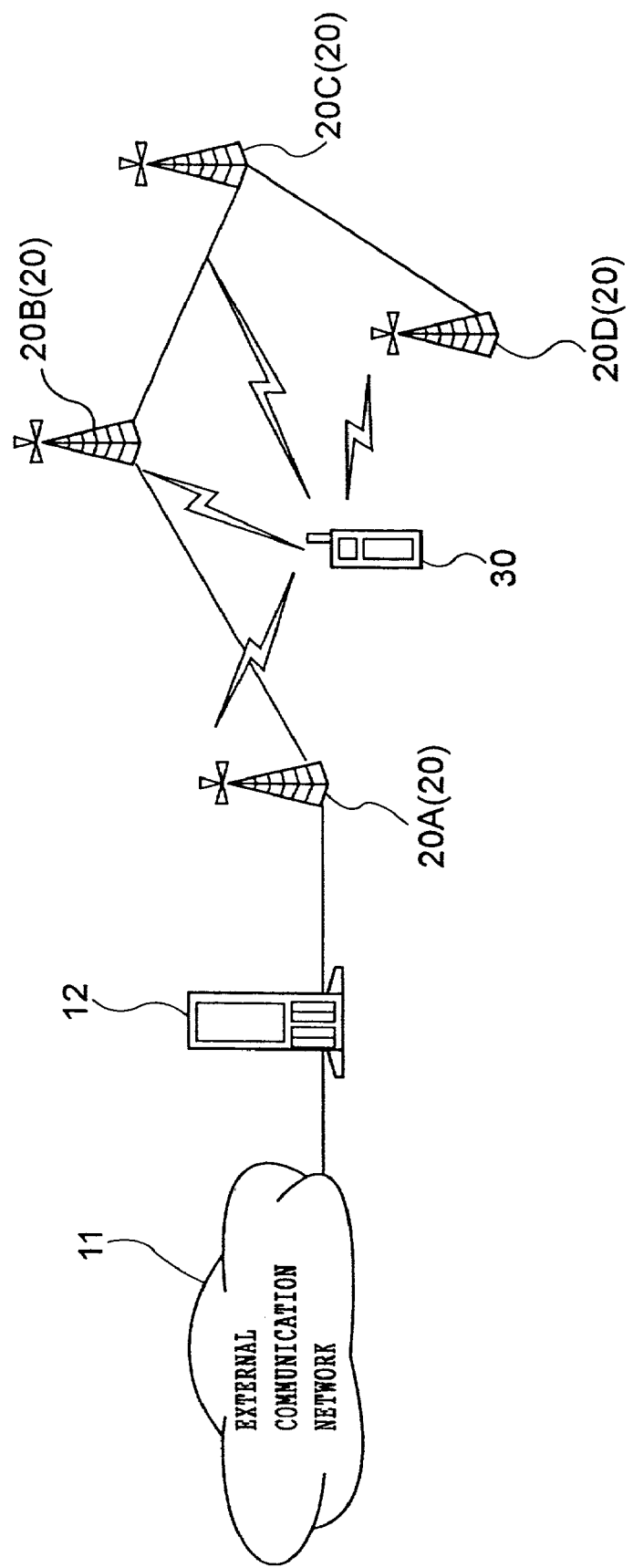
FIG. 1 is a diagram of the system architecture illustrating the overall constitution of the wireless network presented as a first embodiment in a base station selection method of the invention.

In the following, a wireless network described as a first embodiment adopting the base station selection method of the invention will be explained with reference to the drawings. FIG. 1 is a diagram of the system architecture illustrating the overall constitution of the wireless network presented as the first embodiment.

The wireless network 10 shown in FIG. 1 comprises a relay server 12 connected to a external communication network 11, four base stations 20 relay-connected to the relay server 12, and a mobile station 30 in contact with the base stations 20 via radio channels.

Between the four base stations 20 and the relay server 12, the routing path is configured such that the relay server 12 connects to a first base station 20A, the first base station 20A to a second base station 20B, the second base station 20B to a third base station 20C, and the third base station 20C to a fourth base station 20D.

Figure 2:
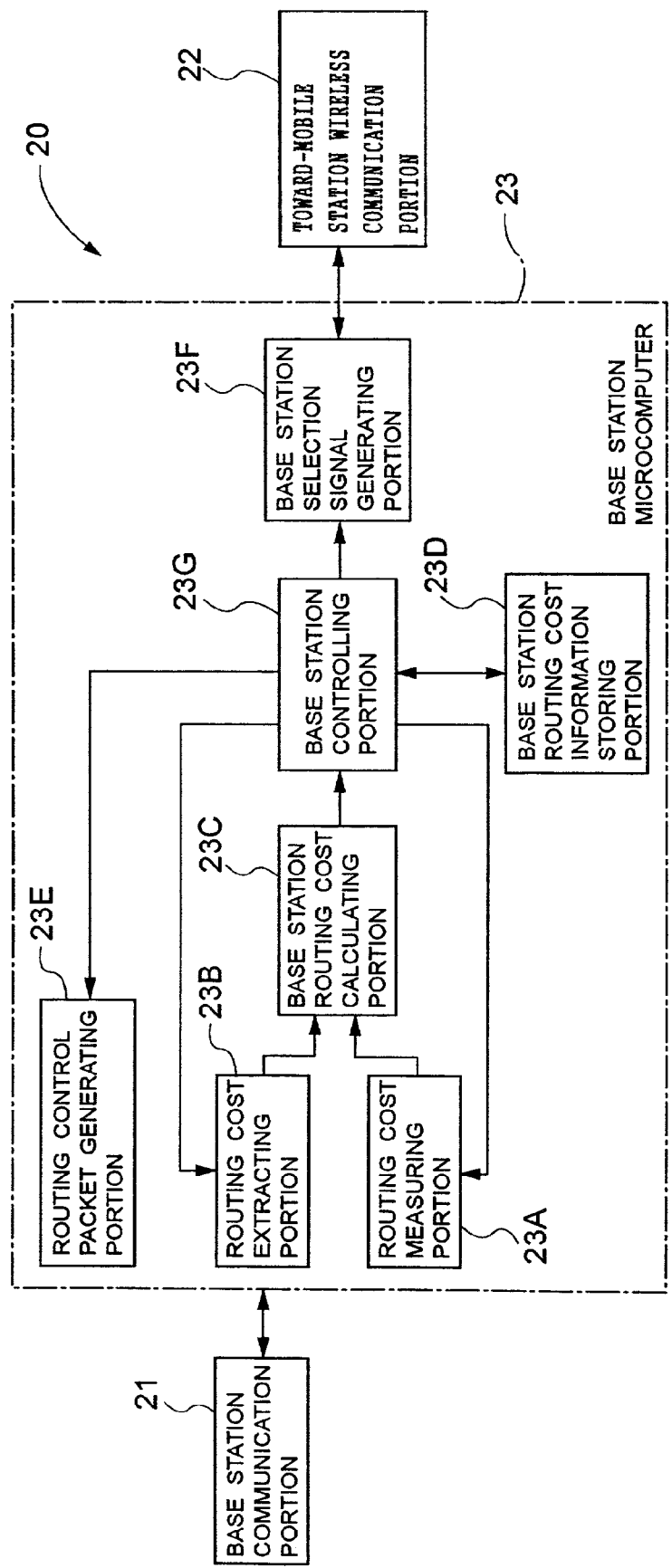
FIG. 2 is a block diagram schematically showing the internal architecture of the base station within a wireless network shown as the first embodiment.

FIG. 2 is a block diagram schematically showing the internal architecture of the base station 20 shown as the first embodiment. The base station 20 shown in FIG. 2 comprises a base station communication portion 21 in communication with other base stations 20, a toward-mobile station wireless communication portion 22 in wireless connection with the mobile station 30 via a radio channel, and a base station microcomputer 23 controlling the entire base station 20.

The base station microcomputer 23 comprises a routing cost measuring portion 23A for measuring routing costs for paths from the base station to other base stations 20, a routing cost extracting portion 23B for receiving routing control packets from other base stations 20 and for extracting the base station routing cost information, base station routing cost calculating portion 23C for calculating the base station routing cost for the base station by adding the routing cost measured by the routing cost measuring portion 23A and the base station routing cost extracted by the routing cost extracting portion 23B, base station routing cost information storing portion 23D for storing and retaining the base station routing cost for the base station calculated by the base station routing cost calculating portion 23C, a routing control packet generating portion 23E for generating routing control packets to send the base station routing cost information to other base stations 20, a base station selection signal generating portion 23F for generating a base station selection signal to send the base station routing cost information to the mobile station 30 capable of communicating with the base station, a recording medium 23H recording a base station routing cost calculation program, and a base station controlling portion 23G for controlling the entire base station microcomputer 23.

Here, while the routing cost information can be the number of relays (the number of hops) along the transmission path or propagation loss or, signal to noise ratio or, and the like, in the following description the number of relays will be considered.

The base station microcomputer 23 at the first base station 20A measures the routing cost for a path between the first base station 20A and the relay server 12 at the routing cost measuring portion 23A upon receiving a base station routing cost calculating command from the relay server 12 at the routing cost extracting portion 23B, and calculates the routing cost at the base station routing cost calculating portion 23C as a first base station routing cost of the first base station 20A.

The base station microcomputer 23 at the second base station 20B measures the routing cost for a path between the first base station 20A and the second base station 20B at the routing cost measuring portion 23A upon extracting the first base station routing cost information from the first base station 20A at the routing cost extracting portion 23B, and calculates the routing cost by adding the routing cost for a path between the first base station 20A and the second base station 20B and the first base station routing cost at the base station routing cost calculating portion 23C as a second base station routing cost.

The base station microcomputer 23 at the third base station 20C measures the routing cost for a path between the second base station 20B and the third base station 20C at the routing cost measuring portion 23A upon extracting a third base station routing cost information from the second base station 20B at the routing cost extracting portion 23B, and calculates the routing cost by adding the routing cost for a path between the second base station 20B and the third base station 20C and the second base station routing cost at the base station routing cost calculating portion 23C as a third base station routing cost.

The base station microcomputer 23 at the fourth base station 20D measures the routing cost for a path between the third base station 20C and the fourth base station 20D at the routing cost measuring portion 23A upon extracting a fourth base station routing cost information from the third base station 20C at the routing cost extracting portion 23B, and calculates the routing cost by adding the routing cost for a path between the third base station 20C and the fourth base station 20D and the third base station routing cost at the base station routing cost calculating portion 23C as a fourth base station routing cost.

Figure 4:
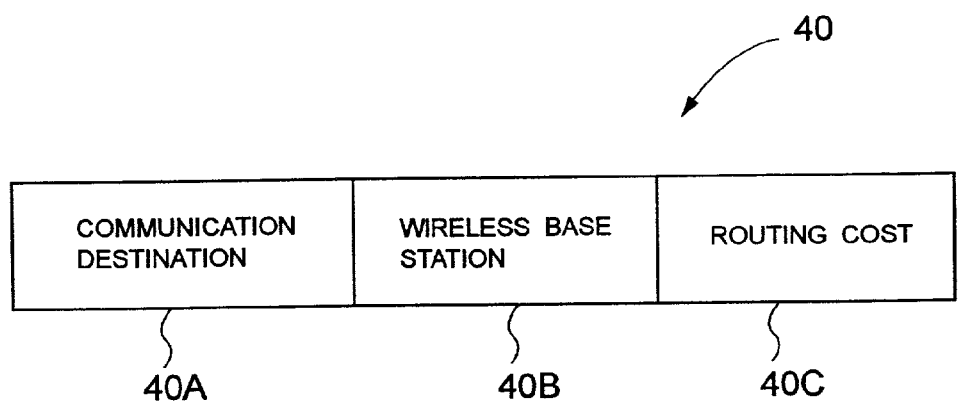
FIG. 4 illustrates how data for a base station routing cost information is constituted for a base station with respect to the first embodiment.

FIG. 4 illustrates how data for a base station routing cost information is constituted.

The base station routing cost 40 shown in FIG. 4 comprises a communication destination name 40A, a base station name 40B, and a routing cost content 40C. For example, the communication destination name 40A may be the relay server 12, the base station name 40B may be the base station itself, and the routing cost content 40C may be the routing cost, e.g. "one hop", for a path between the relay server 12 and the base station 20.

Figure 3:
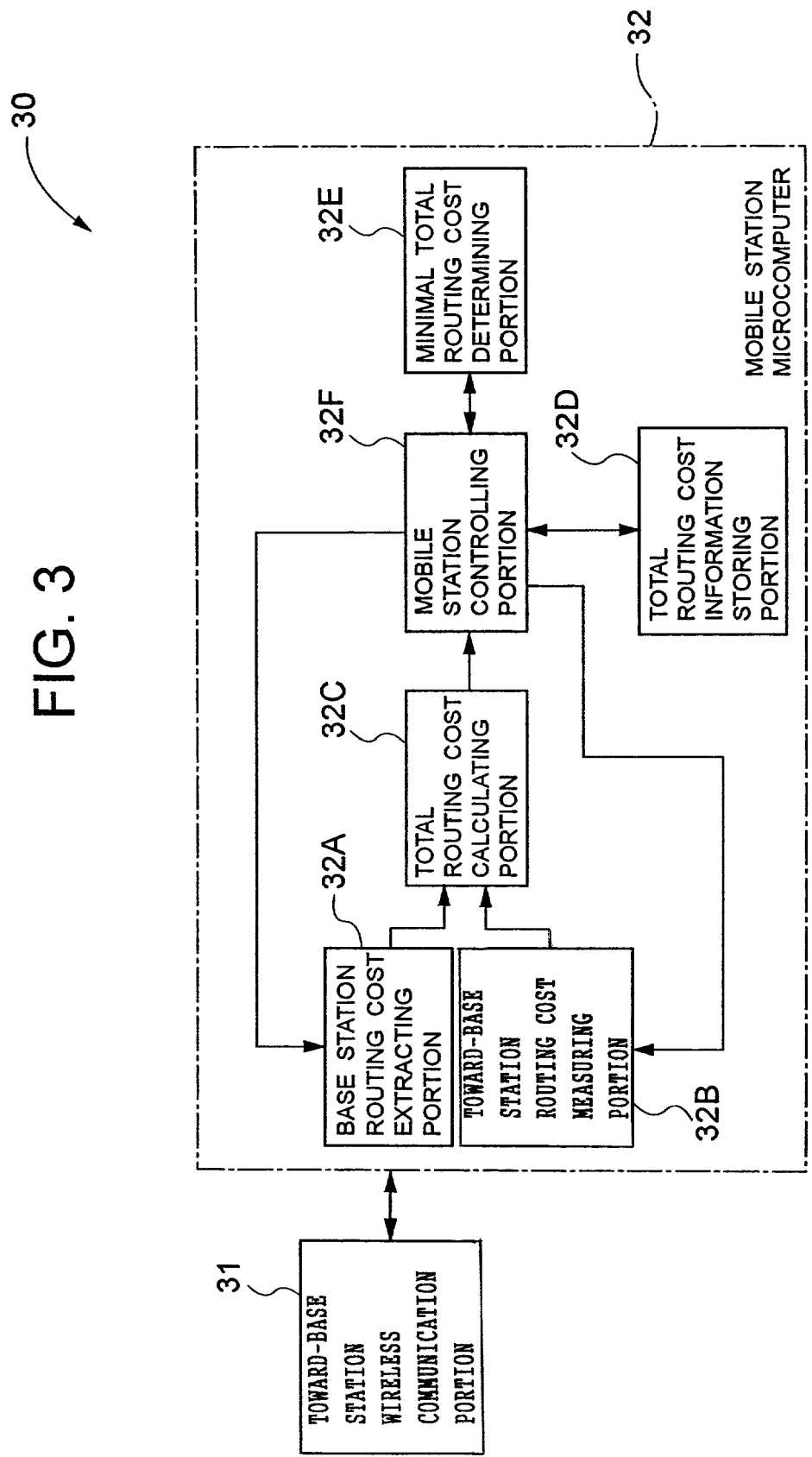
FIG. 3 is a block diagram schematically showing the internal architecture of the mobile station within the wireless network shown as the first embodiment.

FIG. 3 is a block diagram schematically showing the internal architecture of the mobile station 30.

The mobile station 30 shown in FIG. 3 comprises a toward-base station wireless communication portion 31 for communicating with base stations 20 via radio channels, and a mobile station microcomputer 32 controlling the entire mobile station 30.

The mobile station microcomputer 32 comprises abase station routing cost extracting portion 32A for extracting base station routing cost information contained in the base station selection signal, upon reception of a base station selection signal from a base station 20, a toward-base station routing cost measuring portion 32B for measuring the routing cost for the path to the currently connected base station 20 as a toward-base station routing cost, upon extraction of the base station routing cost information, a total routing cost calculating portion 32C for calculating the total routing cost by adding the base station routing cost and the toward-base station routing cost for each base station 20, a total routing cost information storing portion 32D for storing the total routing cost, and a minimal total routing cost determining portion 32E for selecting a base station 20 associated with a minimal total routing cost based on the total routing cost information stored in the total routing cost information storing portion 32D when establishing a relay connection with the relay server 12, a recording medium 32J recording a mobile station routing cost calculation program, and a mobile station controlling portion 32F for controlling the entire mobile station 30.

Figure 5:
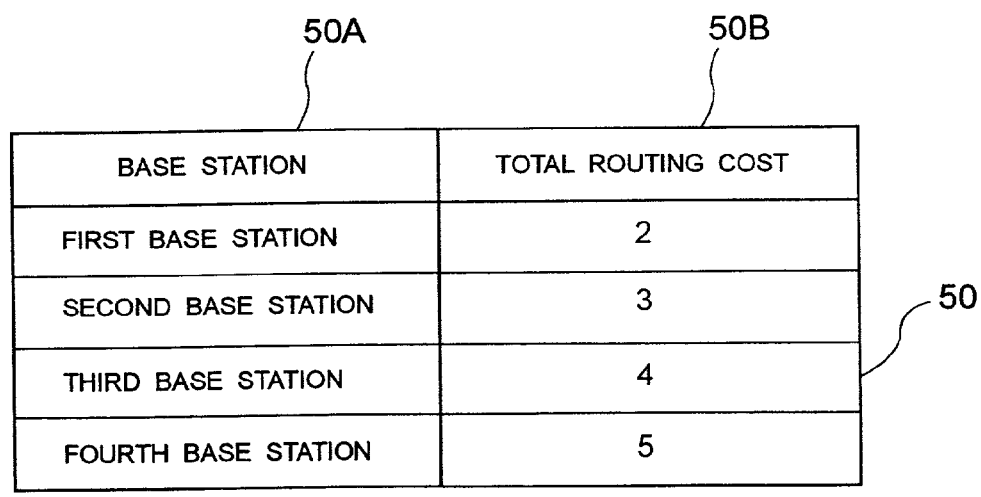
FIG. 5 illustrates the memory content of the total routing cost information storing portion of the mobile station with respect to the first embodiment.

FIG. 5 illustrates the memory content of the total routing cost information storing portion 32D.

The total routing cost information storing portion 32D shown in FIG. 5 stores base station names 50A and total routing cost contents 50B for respective base stations 20.

In claims, the base station routing cost information receiving means corresponds to the toward-base station wireless communication portion 31 and the base station routing cost extracting portion 32A. The toward-base station routing cost measuring means corresponds to the toward-base station routing cost measuring portion 32B. The total routing cost calculating means corresponds to the total routing cost calculating portion 32C. The total routing cost information storing means to the total routing cost information storing portion 32D. The base station selecting means corresponds to the minimal total routing cost determining portion 32E. The predetermined routing cost measuring means corresponds to the predetermined routing cost measuring portion 32G. And the predetermined routing cost information storing means corresponds to the predetermined routing cost information storing portion 32H.

In claims, the base station routing cost measuring means corresponds to the routing cost measuring portion 23A. The base station routing cost information storing means corresponds to the base station routing cost information storing portion 23D.

The base station routing cost information sending means corresponds to the base station selection signal generating portion 23F and the toward-mobile station wireless communication portion 22.

Figure 6A:
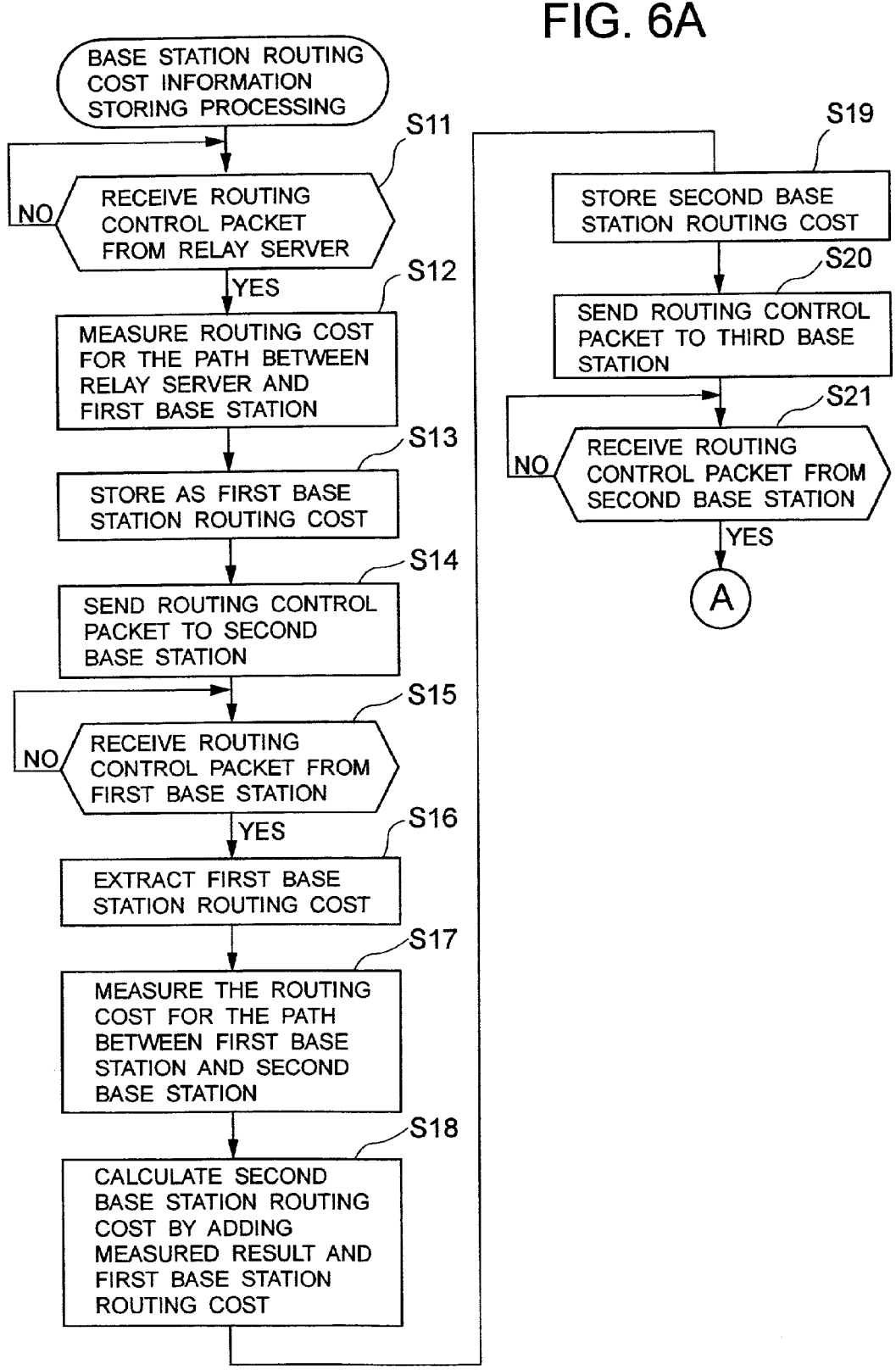
FIGS. 6A and 6B are flow charts describing a series of processing operations on the side of the base station concerning base station routing cost information storing processing in the wireless network shown as the first embodiment.
Figure 6B:
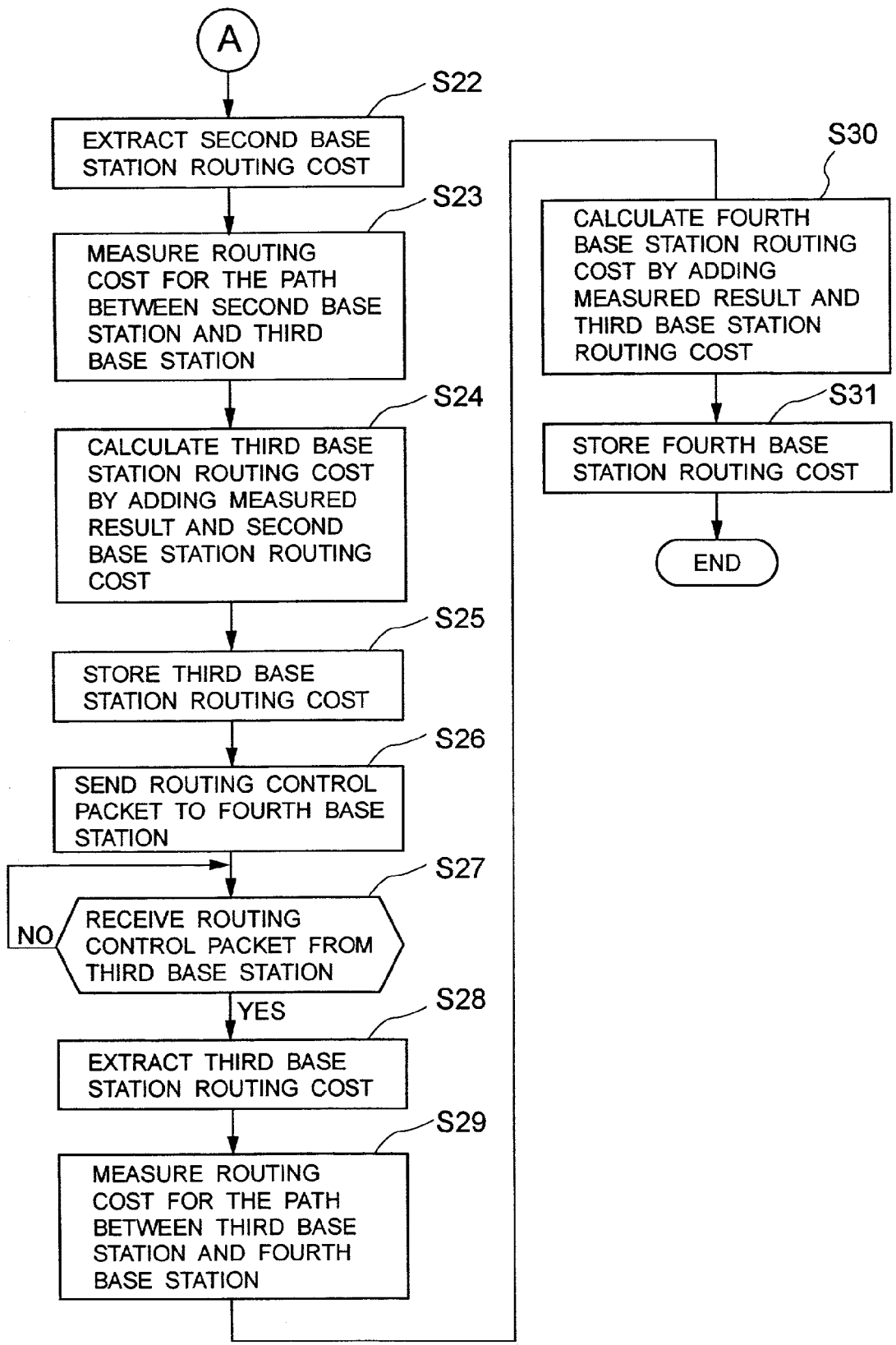

Now, operation of the wireless network 10 shown as the first embodiment is described. FIGS. 6A and 6B are flowcharts describing a series of processing operations on the side of the base station 20 concerning base station routing cost information storing processing in the wireless network 10 shown as the first embodiment.

The base station routing cost information storing processing shown in FIGS. 6A and 6B is processing to measure the routing cost for the path from each base station 20 to the relay server 12 based on routing control packets from the relay server 12, and then store and retain it as a base station routing cost for each base station 20.

In FIGS. 6A and 6B, the base station microcomputer 23 at the first base station 20A determines whether or not a routing control packet has been received from the relay server 12 via the base station communicating portion 21 (step S11). Upon receiving a routing control packet from the relay server 12, the base station microcomputer 23 measures the routing cost for the path between the first base station 20A and the relay server 12 using the routing cost measuring portion 23A (step S12).

The base station microcomputer 23 stores the measured routing cost as the first base station routing cost information in the base station routing cost information storing portion 23D (step S13).

In addition, the base station microcomputer 23 generates a routing control packet for transporting the first base station routing cost information using the routing control packet generating portion 23E to the second base station 20B via the base station communicating portion 21 (step S14).

The base station microcomputer 23 at the second base station 20B determines whether or not a routing control packet has been received from the first base station 20A via the base station communicating portion 21 (step S15). Upon receiving a routing control packet from the first base station 20A, the base station microcomputer 23 extracts the first base station routing cost information from the routing control packet from the first base station 20A using the routing cost extracting portion 23B (step S16).

In addition, the base station microcomputer 23 measures the routing cost for the path between the first base station 20A and the second base station 20B using the routing cost measuring portion 23A (step S17), and calculates the second base station routing cost, which is a routing cost for the path between the relay server 12 and the second base station 20B, by adding the measured routing cost and the first base station routing cost (step S18).

After storing the second base station routing cost information in the base station routing cost information storing portion 23D (step S19), the base station microcomputer 23 generates a routing control packet for transporting the second base station routing cost information using the routing control packet generating portion 23E to the third base station 20C via the base station communicating portion 21 (step S20).

The base station microcomputer 23 at the third base station 20C determines whether or not a routing control packet has been received from the first base station 20A via the base station communicating portion 21 (step S21). Upon receiving a routing control packet from the second base station 20B, the base station microcomputer 23 extracts the second base station routing cost information from the routing control packet from the second base station 20B using the routing cost extracting portion 23B (step S22).

In addition, the base station microcomputer 23 measures the routing cost for the path between the second base station 20B and the third base station 20C using the routing cost measuring portion 23A (step S23), and calculates the third base station routing cost, which is a routing cost for the path between the relay server 12 and the third base station 20C, by adding the measured routing cost and the second base station routing cost (step S24).

After storing the third base station routing cost information in the base station routing cost information storing portion 23D (step S25), the base station microcomputer 23 generates a routing control packet for transporting the third base station routing cost information using the routing control packet generating portion 23E to the fourth base station 20D via the base station communicating portion 21 (step S26).

The base station microcomputer 23 at the fourth base station 20D determines whether or not a routing control packet has been received from the third base station 20C via the base station communicating portion 21 (step S27). Upon receiving a routing control packet from the third base station 20C, the base station microcomputer 23 extracts the third base station routing cost information from the routing control packet from the third base station 20C using the routing cost extracting portion 23B (step S28).

In addition, the base station microcomputer 23 measures the routing cost for the path between the third base station 20C and the fourth base station 20D using the routing cost measuring portion 23A (step S29), and calculates the fourth base station routing cost, which is a routing cost for the path between the relay server 12 and the fourth base station 20D, by adding the measured routing cost and the third base station routing cost (step S30).

The base station microcomputer 23 terminates the processing operation by storing the fourth base station routing cost information in the base station routing cost information storing portion 23D (step S31).

Thus, according to the base station routing cost information storing processing, for each base station 20, the routing cost for the path between the base station 20 and the relay server 12 can be calculated, and the routing cost information can be stored and retained as the base station routing cost. Here, the program described by the flow charts of FIGS. 6A and 6B is recorded on the recording medium 23H at the base station 20, and the base station controlling portion 23G controls the entire base station microcomputer 23 in accordance with the program.

Figure 7:
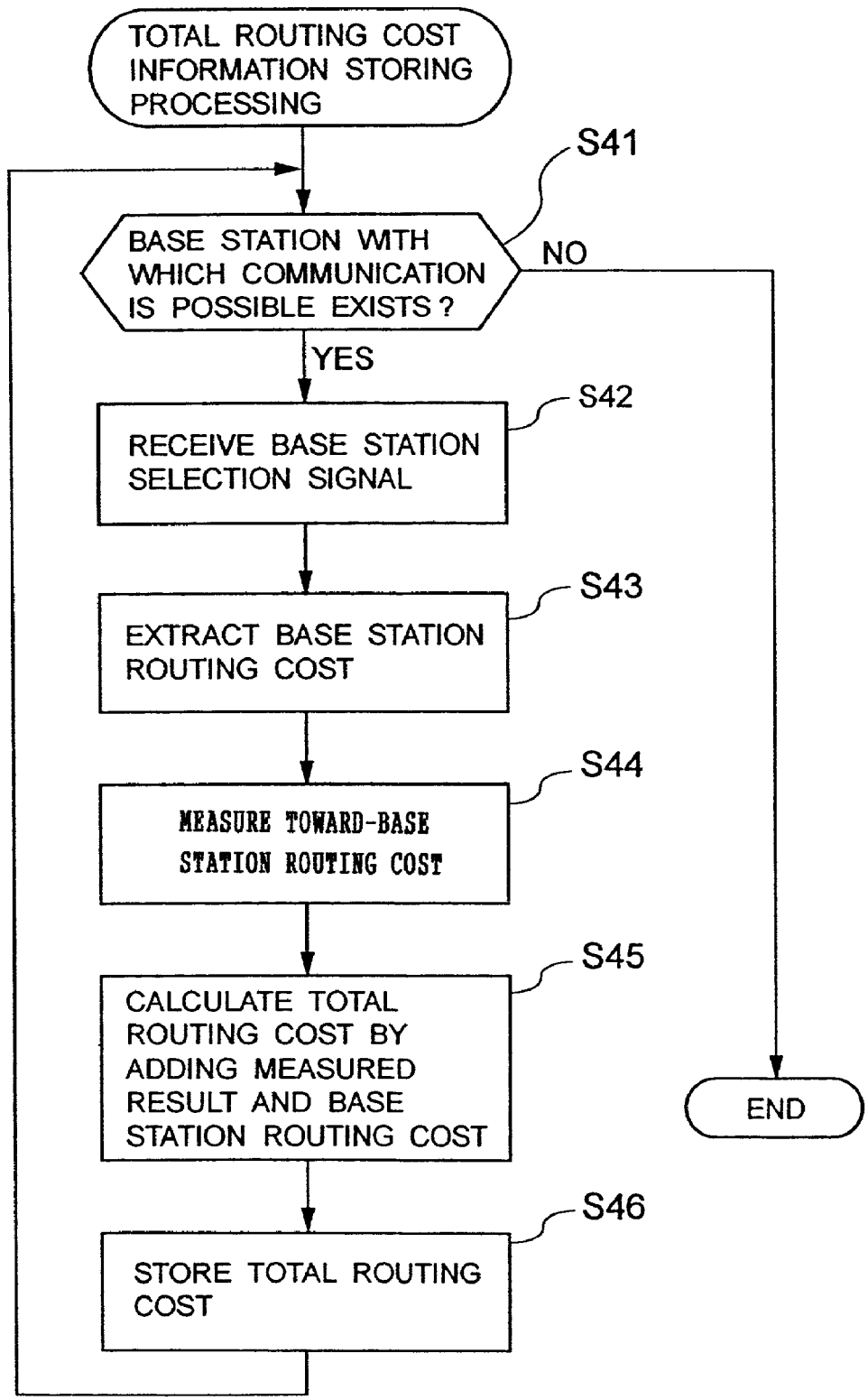
FIG. 7 is a flow chart illustrating a processing operation concerning total routing cost information storing processing on the side of the mobile station in the wireless network shown as the first embodiment.

FIG. 7 is a flow chart illustrating a processing operation concerning total routing cost information storing processing on the side of the mobile station 30.

The total routing cost information storing processing shown in FIG. 7 is processing to store and retain on the total routing cost calculating for each base station 20 which represents the routing cost for the path between the mobile station 30 and the relay server 12 through each base station 20.

In FIG. 7, the mobile station microcomputer 32 determines an existence of a base station 20 with which the mobile station can communicate via the toward-base station wireless communication portion 31 (step S41).

Upon determining an existence of a base station 20, the mobile station microcomputer 32 receives abase station selection signal from the base station 20 (step S42). Upon receiving the base station selection signal, the mobile station microcomputer 32 extracts base station routing cost information from the base station selection signal using the base station routing cost extracting portion 32A (step S43). After extracting the base station routing cost information, the mobile station microcomputer 32 measures a toward-base station routing cost which is a routing cost for the path between the base station 20 which sends the received signal and the mobile station 30 using the toward-base station routing cost measuring portion 32B (step S44).

The mobile station microcomputer 32 calculates a total routing cost by adding the toward-base station routing cost and the base station routing cost concerning the base station 20 in the total routing cost calculating portion 32C (step S45), stores and retains the total routing cost for each base station 20 in the total routing cost information storing portion 32D (step S46), and then proceeds to step S41 to determine whether or not there is any additional base station 20 from which signal reception is possible.

Thus, according to the total routing cost information storing processing, the routing cost for the path between the mobile station 30 and the relay server 12 may be stored and retained for each base station 20 on the side of the mobile station 30.

In other words, the mobile station 30, when establishing a connection with the relay server 12 for communicating with the external communication network, refers to the total routing cost information stored and retained in the total routing cost information storing portion 32D to select a base station 20 that minimizes the total routing cost. Here, the program described by the flow chart of FIG. 7 is recorded on the recording medium 32J at the mobile station 30, and the mobile station controlling portion 32F controls the entire mobile station microcomputer 32 in accordance with the program.

According to the first embodiment, each base station 20 measures the base station routing cost for the path between itself and the relay server 12, the mobile station 30 measures the toward-base station routing cost for the path between itself and each base station 20. The mobile station 30 calculates the total routing cost for each base station 20 by adding the base station routing cost and the toward-base station routing cost for each base station 20, and stores the total routing cost information for each base station 20. When the mobile station 30 establishes a relay connection with the relay server 12, the mobile station 30 selects a base station 20 associated with a minimal total routing cost based on the stored total routing cost information, hence, resources of the entire wireless network may be used efficiently, and the mobile station 30 can obtain optimal quality in its communication with the relay server 12.

Also, according to the first embodiment, since the base station routing cost information is sent to the mobile station 30 with a normally used base station selection signal, there is no need ato use another wireless resources for sending the base station routing cost information.

Here, in the above described first embodiment, while the base station routing cost, the toward-base station routing cost, and the total routing cost are assumed to be routing information based on the number of relays, a greater accuracy can be achieved in selecting a base station by adopting routing information based on other elements like propagation loss, signal to noise ratio, or signal to interference ratio.

Figure 8:
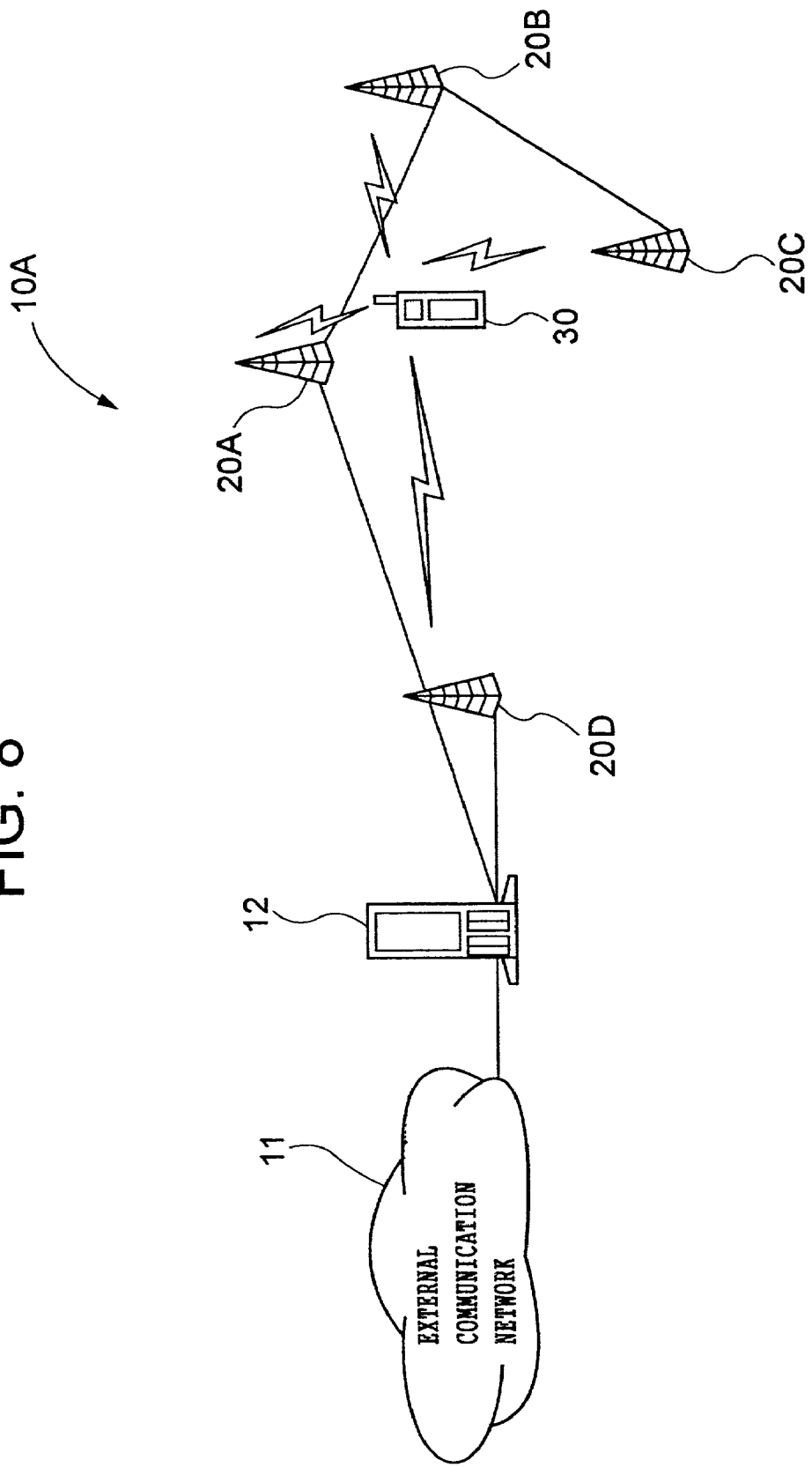
FIG. 8 is a diagram of the system architecture illustrating the overall constitution of the wireless network presented as a second embodiment.

Also, in the wireless network 10 illustrated in the above described first embodiment, while a base station 20 associated with a minimal total routing cost is selected by the mobile station 30 based on the total routing cost information stored in the total routing cost information storing portion 32D using the routing cost as the number of relays, there may be a case where a plurality of base stations are associated with the same minimal total routing cost since communication is relayed for the same number of times either with the first base station 20A or with the fourth base station 20D in the wireless network 10A in the case shown in FIG. 8.

Figure 9:
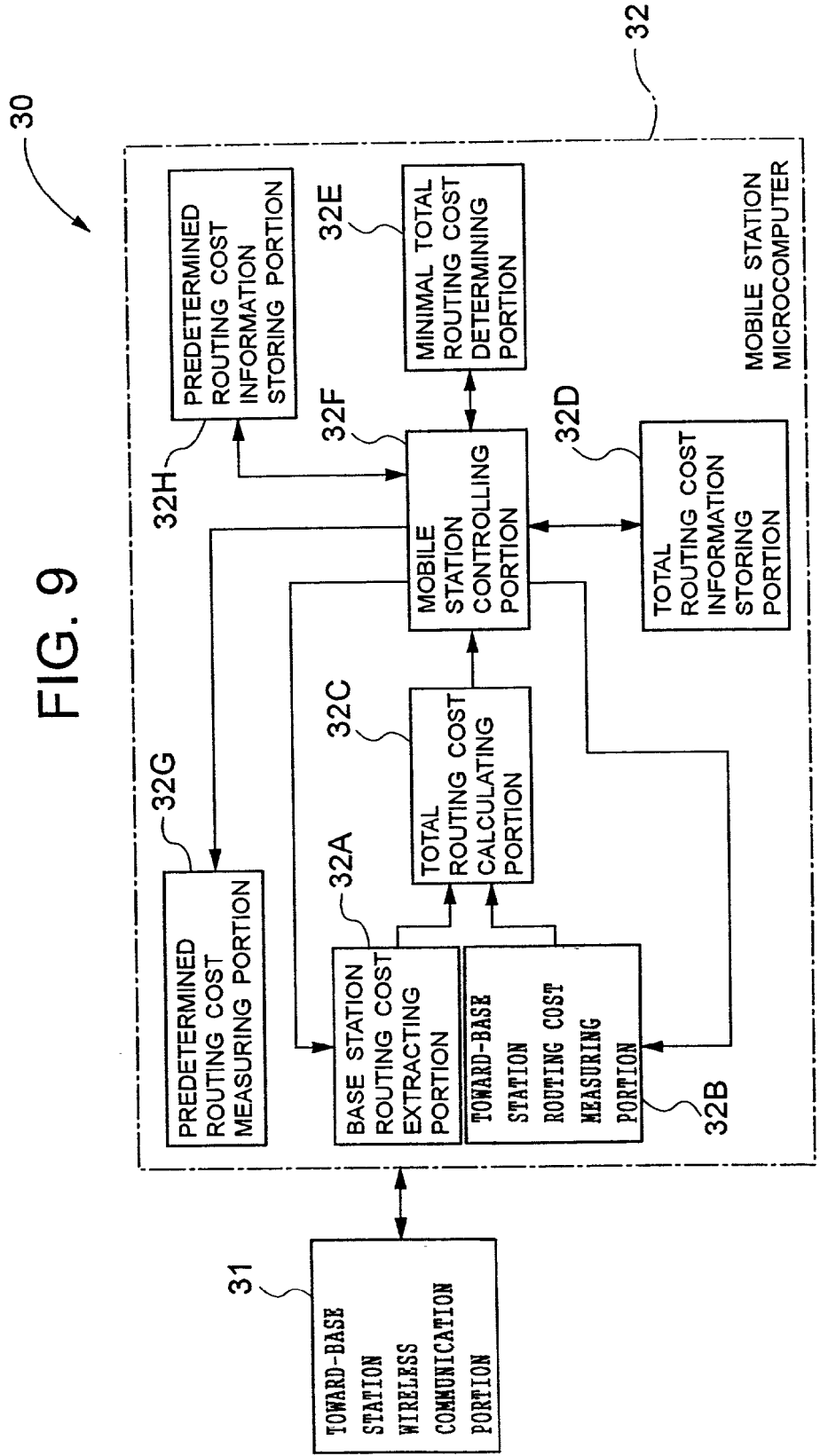
FIG. 9 is a block diagram showing the overall internal architecture of the mobile station in the wireless network shown as the second embodiment.
Figure 10:
FIG. 10 illustrates the memory content of the total routing cost information storing portion and the predetermined routing cost information storing portion of the mobile station within the wireless network shown as the second embodiment.
Figure 11:
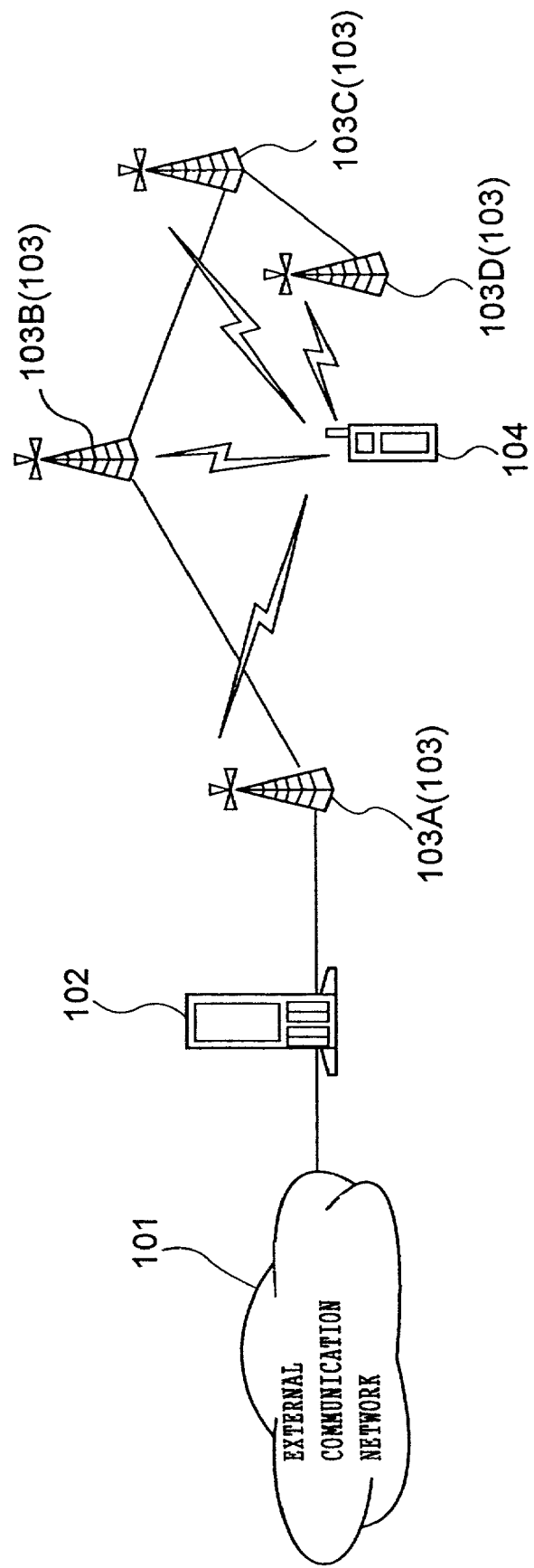
FIG. 11 is a block diagram showing the overall architecture of a wireless network adopting a prior art method of selecting a base station.

Thus, in the wireless network 10A described as the second embodiment, even in cases where there are a plurality of base stations associated with the same minimal total routing cost, the invention proposes a solution to select the most appropriate base station 20 among them. Note that descriptions of architectures and operations will be omitted about components with the same reference numerals in the wireless network 10 described as the first embodiment. FIG. 9 is a block diagram schematically showing the internal architecture of the mobile station microcomputer 32 in the wireless network 10A described as the second embodiment. FIG. 10 illustrates the memory content of the predetermined routing cost information storing portion 32H.

The mobile station microcomputer 32 shown in FIG. 9 comprises a predetermined routing cost measuring portion 32G for measuring a routing cost, that is different type from the toward-base station routing cost, for each base station 20 along the path between the mobile station and the base station 20, for example, propagation loss as a predetermined routing cost, and a predetermined routing cost information storing portion 32H for storing the predetermined routing cost for each base station 20. And the minimal total routing cost determining portion 32E selects a base station 20 associated with a minimal predetermined routing cost (e.g. the fourth base station 20D) based on the memory content 60 shown in FIG. 10 when there are two base stations with a minimal total routing cost (e.g. the first base station 20A and the fourth base station 20D).

Thus, according to the second embodiment, a routing cost, that is different type from the toward-base station routing cost, is measured as a predetermined routing cost in advance for each base station 20 along the path between the mobile station and the base station 20. And when there are a plurality of base stations with the same minimal total routing cost, a base station 20 with a minimal predetermined routing cost is selected based on the predetermined routing cost information, thereby it leads to select the most appropriate base station 20 with a greater accuracy.

Here, in the above described second embodiment, propagation loss between a base station 20 and the mobile station 30 is applied as the predetermined routing cost. Propagation loss between the mobile station 30 and the relay server 12 may be used as the predetermined routing cost instead in the same manner as the total routing cost.

Also, according to the second embodiment, while propagation loss is used as the predetermined routing cost, of course, routing information based on either one of signal to noise ratio and signal to interference ratio may be used to achieve the same effect.

Also, according to the second embodiment, while one type of predetermined routing cost is used, a plurality of types may be used to select the most appropriate base station 20 with a greater accuracy.

Also, according to the second embodiment, though a routing cost between a base station 20 and the mobile station 30 is used as a predetermined routing cost (toward-base station routing cost), a routing cost between the relay server 12 and the mobile station 30 (total routing cost) may be used to select the most appropriate base station 20 with a greater accuracy.

Also, according to the above described first and second embodiments, while respective base stations 20 are described as using wired channels by way of example, a wireless multi-hop network using radio channels may be used. In that case, it can be more effective to use propagation loss or signal to noise ratio or signal to interference ratio as routing information instead of the number of relays.

In the above described first and second embodiments, selection of a base station 20 relies on the total routing cost for the path to the communication destination. Thus, the system can be operated with higher efficiency eliminating wasteful use of network resources, and also communication performance can be improved in terms of the whole network. Particularly in the case of a wireless multi-hop network where communication quality depends on the paths significantly, great improvement in communication performance is achieved because the base station 20 that offers an optimal quality to reach the communication destination is selected.

In addition, when there are a plurality of base stations with the same minimal total routing cost, a base station 20 associated with a minimal predetermined routing cost may be selected. Thus, transmission power of the mobile station 30 may be reduced, for example, and consequently, radio interference of the entire network may be reduced. As a result, efficient use of radio resources may be achieved. This is particularly advantageous in a wireless multi-hop network in which communication quality depends on the paths significantly.

Here, according to the above described first embodiment, as shown in FIG. 1, a topology in which the relay server 12 and respective base stations 20 are connected in series via radio channels (relay server 12—base station 20A—base station 20B base station 20C—base station 20D) is described.

However, the invention is not limited to topologies in which a communication network and respective base stations are connected in series. The invention may also be applied to any cases like the Internet such that each base station selects a node in any neighbor nodes to connect with. This will be described below.

Referring to FIG. 1, a case where the relay server 12 and respective base stations 20 are connected in series via radio channels, and the base stations 20A and 20C are connected with each other will be described.

Here, the base station 20C receives two routing control packets recording base station routing cost information from both of the base stations 20A and 20B. Then, base station 20C, just like the mobile station according to the invention, measures a routing cost for the path between itself (base station 20C) and the base station 20A, as well as between itself and the base station 20B. Base station 20C adds the measured routing costs and base station routing costs contained in the routing control packets, and selects one with a lower total routing cost.

Here, the base station 20C sends routing control packets not only to the base station 20D in downstream, but also to the base stations 20A and 20B. However, the base stations 20A and 20B invalidate the routing control packets received from the base station 20C. Because the routing cost for the path between 20A and the relay server is lower than the one for the path through the base station 20C. Because the routing cost for the path through the base station 20C is higher than the one for the existing path between the relay server and the base station 20A as well as 20B.

In other words, at each base station 20, any method may be used for measuring a routing cost. Thus, possession of base station routing cost information is only required to apply the invention.

According to the base station selection method of the invention with the above described configuration, each base station retains base station routing cost information for the path between itself and the communication network, the mobile station measures toward-base station routing cost between itself and each base station, calculates a total routing cost for each base station by adding a base station routing cost and a toward-base station routing cost for each base station, stores the total routing cost information for each base station, and selects a base station associated with a minimal total routing cost based on the stored total routing cost information when the mobile station establishes a relay connection with the communication network. Thus, resources of the entire wireless network may be used efficiently, thereby allowing the mobile station to obtain optimal quality in its communication with the communication network.

Also, according to the invention, the mobile station receives a routing cost information between each base station, that the mobile station can communicate with, and the communication network, measures toward-base station routing costs for the paths between itself and base stations, calculates a total routing cost for each base station by adding the base station routing cost and the toward-base station routing cost for each base station, stores the total routing cost for each base station, and selects abase station associated with a minimal total routing cost based on the stored total routing cost information when the mobile station establishes a relay connection with the communication network. Thus, it leads efficient using of resources of the entire wireless network and, optimal quality may be achieved in the communication between the mobile station and the communication network.

Also, according to the base station of the invention, since the base station routing cost information for the path between the base station and the communication network is stored in advance, and the stored base station routing cost information is sent to the mobile station using the base station selection signal, resources of the entire wireless network are used efficiently, thereby allowing the mobile station to obtain optimal quality in its communication with the communication network.

What is claimed is:

1. A base station selection method, in a communication network comprising a plurality of base stations relay-connected to the network and a mobile station connected to the base stations via radio channels, for selecting the most appropriate base station from a plurality of base stations for communicating with a mobile station when said mobile station establishes a relay connection with the communication network, comprising:
   a sending step of information to mobile stations, the information is retained by each base station and includes a routing cost between the base station and a communication network;
   a receiving step of the cost information of the base station at said mobile station from each base station;
   a measuring step of a toward-base station routing cost that is used by a mobile station and measures a toward-base station routing cost between the mobile station and each base station;
   a total routing calculating step of calculating at said mobile station a total routing cost for each base station by adding the base station routing cost and the toward-base station routing cost;
   a total routing cost information storing step of storing at said mobile station the total routing cost information for each base station; and
   a base station selecting step that selects a base station associated with a minimal total routing cost from the stored routing cost information at said mobile station when establishing a relay connection with said communication network.

2. The base station selection method according to claim 1, wherein said plurality of base stations are connected with each other via radio channels.

3. The base station selection method according to claim 1, wherein said sending step of information sends said base station routing cost information to said mobile station using a base station selection signal.

4. The base station selection method according to claim 1, wherein said base station routing cost, said toward-base station routing cost, and said total routing cost are routing information based on a number of relays, or propagation loss, or signal to noise ratio, or signal to interference ratio.

5. The base station selection method according to claim 1, comprising:
   a predetermination measuring step of measuring at said mobile station for each base station, for the path between said mobile station and the base station, in which a routing cost that is different from the toward-base station routing cost as a predetermined routing cost, and
   a predetermination storing step of storing at said mobile station predetermined routing cost information for each base station, wherein
   said base station selecting step, when there are a plurality of base stations with said minimal total routing cost, selects a base station associated with a minimal predetermined routing cost based on predetermined routing cost information concerning the base stations with the minimal total routing cost.

6. The base station selection method according to claim 5, wherein said plurality of base stations are connected with each other via radio channels.

7. The base station selection method according to claim 5, wherein said sending step sends said base station routing cost information to said mobile station using a base station selection signal.

8. The base station selection method according to claim 5, wherein said base station routing cost, said toward-base station routing cost, and said total routing cost are routing information based on a number of relays, or propagation loss, or signal to noise ratio, or signal to interference ratio, and wherein said predetermined routing cost is routing information based on a number of relays, or propagation loss, or signal to noise ratio, or signal to interference ratio.

9. The base station selection method according to claim 1, comprising a measuring step of the base station routing cost.

10. The base station selection method according to claim 1, wherein a method of calculating base station routing cost at said base station comprises,
    a calculating step of a toward-relay server routing cost for a relay server that is for calculating a routing cost for the path between the relay server and the base station, and
    a routing cost information sending step of sending to neighboring base stations information of the routing cost calculated in said toward-relay server routing cost calculating step.

11. The base station selection method according to claim 1, wherein a base station routing cost calculating method at said base station comprises,
    a routing cost information receiving step of receiving routing cost information from one neighboring base station, a calculating step of a toward-neighboring base station routing cost that is for calculating a routing cost for the path between said neighboring base station and the base station, a routing cost adding step of adding the routing cost received in said routing cost information receiving step and the routing cost calculated in said toward-neighboring base station routing cost calculating step, and
    an addition result sending step of sending to the other neighboring base station the addition result from said routing cost adding step.

12. A mobile station that communicates with a plurality of base stations relay-connected to a communication network via radio channels, and selects the most appropriate base station from among said plurality of base stations when establishing a relay connection with said communication network, comprising:
    receiving means of a base station routing cost, that receives information, which includes the base station routing cost for the path between the base station and the communication network, for each base station which can communicate with the mobile station;
    measuring means of the toward-base station routing cost that measures a routing cost between the mobile station and each base station which can communicate with the mobile station;
    total routing cost calculating means for calculating a total routing cost for said each base station which can communicate with the mobile station by adding the base station routing cost and the toward-base station routing cost;
    total routing cost information storing means for storing a total routing cost for each base station which can communicate with the mobile station; and base station selecting means for selecting a base station associated with a minimal total routing cost based on the total routing cost information stored in said total routing cost information storing means when the mobile station establishes a relay connection with the communication network.

13. The mobile station according to claim 12, wherein said plurality of base stations are connected with each other via radio channels.

14. The mobile station according to claim 12, wherein said base station routing cost, said toward-base station routing cost, and said total routing cost are routing information based on the number of relays, or propagation loss, or signal to noise ratio, or signal to interference ratio.

15. The mobile station according to claim 12, comprising:
predetermined routing cost measuring means for measuring for each base station which can communicate with the mobile station, for the path between the mobile station and the base station a routing cost that is different from said toward-base station routing cost as a predetermined routing cost; and
predetermined routing cost information storing means for storing the predetermined routing cost for the base station, wherein
said base station selecting means, when there are a plurality of base stations with said minimal total routing cost, selects a base station associated with a minimal predetermined routing cost based on the predetermined routing cost information concerning the base stations with the minimal total routing cost.

16. The mobile station according to claim 15, wherein said plurality of base stations are connected with each other via radio channels.

17. The mobile station according to claim 15, wherein said base station routing cost, said toward-base station routing cost, and said total routing cost are routing information based on the number of relays, or propagation loss, or signal to noise ratio, or signal to interference ratio, and wherein said predetermined routing cost is routing information based on the number of relays, or propagation loss, or signal to noise ratio, or signal to interference ratio.

18. A recording medium recording a program for having a computer execute a base station selection method, in a communication network comprising a plurality of base stations relay-connected to the network and a mobile station connected to the base stations via radio channels, of selecting the most appropriate base station from said plurality of base stations for communicating with said mobile station when said mobile station establishes a relay connection with the communication network, wherein,
a program for a base station routing cost calculating method at said base station comprises,
a routing cost information receiving step of receiving routing cost information from one neighboring base station,
a toward-neighboring base station routing cost calculating step of calculating a routing cost for the path between said neighboring base station and the base station,
a routing cost adding step of adding the routing cost received in said routing cost information receiving step and the routing cost calculated in toward-neighboring base station routing cost calculating step, and
an addition result sending step of sending to the other neighboring base station the addition result from said routing cost adding step.

19. A recording medium recording a program for having a computer execute a base station selection method, in a communication network comprising a plurality of base stations relay-connected to the network and a mobile station connected to the base stations via radio channels, of selecting the most appropriate base station from among said plurality of base stations for communicating with said mobile station when said mobile station establishes a relay connection with the communication network, wherein,
a program for a mobile station routing cost calculating method at said mobile station comprises,
a routing cost information receiving step of receiving base station routing cost information from said base station,
a toward-base station routing cost measuring step of measuring at said mobile station for each base station a toward-base station routing cost for the path between said mobile station and said base station,
a total routing calculating step of calculating for each base station a total routing cost by adding at said mobile station said base station routing cost and the toward-base station routing cost for each base station, and
a total routing storing step of storing at said mobile station the total routing cost for each base station.

* * * * *